United States Patent
Lang et al.

(10) Patent No.: US 10,685,066 B2
(45) Date of Patent: Jun. 16, 2020

(54) ON-LINE CONTENT SAMPLING

(71) Applicant: Oath Inc., New York, NY (US)

(72) Inventors: Kevin J. Lang, Mountian View, CA (US); Edo Liberty, Or-Yehuda (IL); Konstantin Shmakov, San Jose, CA (US)

(73) Assignee: Oath Inc., New York, NY (US)

( * ) Notice: Subject to any disclaimer, the term of this patent is extended or adjusted under 35 U.S.C. 154(b) by 426 days.

(21) Appl. No.: 14/986,180

(22) Filed: Dec. 31, 2015

(65) Prior Publication Data

US 2017/0193109 A1 Jul. 6, 2017

(51) Int. Cl.
*G06F 16/951* (2019.01)
*G06F 9/38* (2018.01)
*G06N 20/00* (2019.01)
*G06N 7/00* (2006.01)

(52) U.S. Cl.
CPC .......... *G06F 16/951* (2019.01); *G06F 9/3802* (2013.01); *G06N 7/005* (2013.01); *G06N 20/00* (2019.01)

(58) Field of Classification Search
CPC ............. G06F 17/30864; G06F 9/3802; G06F 17/30867; G06F 17/3053; G06N 99/005
USPC .......................................................... 707/709
See application file for complete search history.

(56) References Cited

U.S. PATENT DOCUMENTS

| | | | | |
|---|---|---|---|---|
| 2005/0223019 A1* | 10/2005 | Das | ................... | G06F 17/30536 |
| 2010/0063948 A1* | 3/2010 | Virkar | ................... | G06N 99/005 706/12 |
| 2014/0303933 A1* | 10/2014 | Simitsis | ................ | G06Q 10/063 702/181 |
| 2014/0317121 A1* | 10/2014 | Inagaki | .................. | G06F 16/353 707/739 |
| 2015/0019529 A1* | 1/2015 | Veldhuizen | ........ | G06F 17/30469 707/719 |
| 2015/0347519 A1* | 12/2015 | Hornkvist | ......... | G06F 17/30522 707/722 |
| 2015/0379072 A1* | 12/2015 | Dirac | .................... | G06N 99/005 707/693 |
| 2015/0379428 A1* | 12/2015 | Dirac | ..................... | G06N 20/00 706/12 |

OTHER PUBLICATIONS

Acharya, Gibbons and Poosala, "Congressional Samples for Approximate Answering of Group—By Queries", ACM SIGMOD vol. 29 Issue 2, Jun. 2000, pp. 487-498.
Joshi and Jermaine, "Robust Stratified Sampling Plans for Low Selectivity Queries", ICDE, 2008, pp. 199-208.
Chaudhuri, Das and Narasaya, "Optimized Stratified Sampling for Approximate Query Processing", ACM Trans. Datab. Syst. 32, 2, Article 9 (Jun. 2007), 50 pages.
Valiant, L.G. "A Theory of the Learnable", Communications of the ACM, Nov. 1984, vol. 27, No. 11, pp. 1134-1142.

\* cited by examiner

*Primary Examiner* — Syed H Hasan
*Assistant Examiner* — Nicholas E Allen
(74) *Attorney, Agent, or Firm* — Cooper Legal Group, LLC

(57) ABSTRACT

Briefly, embodiments disclosed herein relate generally to on-line content sampling, and more particularly to utilization of machine learning techniques to sample on-line content in a search engine environment, for example.

26 Claims, 6 Drawing Sheets

ON-LINE CONTENT SAMPLING

BACKGROUND

Field

Subject matter disclosed herein relates generally to on-line content, and more particularly to sampling of on-line content, for example.

Content

The Internet is widespread. The World Wide Web or simply the Web, provided by the Internet, is growing rapidly, at least in part, from the large amount of content being added seemingly on a daily basis. A wide variety of on-line content in the form of stored signals and/or states, such as, web pages, text documents, images, audio files, and/or video files, for example, is continually being processed, such as, identified, located, retrieved, accumulated, stored, and/or communicated, for example. With so much on-line content being available, a number of tools and/or services may be provided to users so as to allow for copious amounts of content to be searched in a more efficient and/or more effective manner. For example, service providers may allow users to search the Web and/or other like networks using various systems, such as content management systems, including search engines, for example. Search engines may, for example, help a user to search the Web from a search query so as to try to locate and/or retrieve content of interest.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
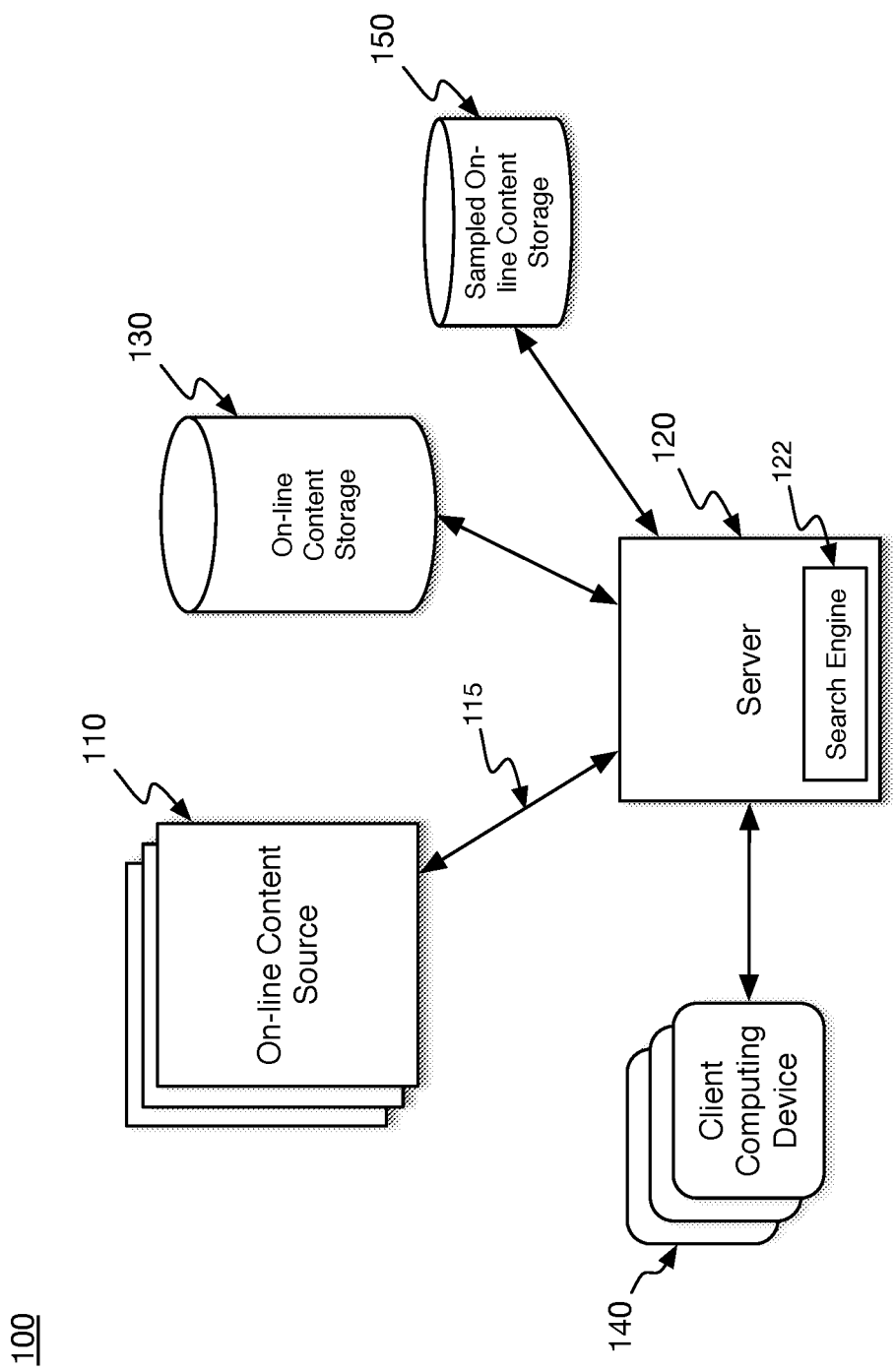
FIG. 1 is a schematic diagram illustrating an example search engine environment, in accordance with an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system comprises the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies). A system may employ such an architecture for processing by marshaling distributed servers, running various tasks in parallel, and managing communications and signal transfers between various parts of the system, in an embodiment. As mentioned, one non-limiting, but well-known example comprises the Hadoop distributed computing system. It refers to an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture.

In this context, the term "network device" refers to any device capable of communicating via and/or as part of a network and may comprise, for example, a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise a service that organizes stored on-line content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, executable by a computing device to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "on-line content", "record", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content provided to a user in a form so that the user is able to perceive the underlying content itself (e.g., hear audio or see images, as examples) is referred to, with respect to the user, as 'consuming' content, 'consumption' of content, 'consumable' content and/or similar terms. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, for example, as may take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are substantially compatible and/or substantially compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically affects a single remote device.

A network may be very large, such as comprising thousands of nodes, millions of nodes, billions of nodes, or more, as examples. As mentioned, the Internet is widespread. The Web, provided by the Internet, is growing rapidly, at least in part, from the large amount of on-line content being added seemingly on a daily basis. A wide variety of on-line content in the form of stored signals and/or states, such as, web pages, text documents, images, audio files, and/or video files, for example, is continually being processed, such as, identified, located, retrieved, accumulated, stored, and/or communicated, for example. With so much on-line content being available, a number of tools and/or services may be provided to users so as to allow for copious amounts of on-line content to be searched in a more efficient and/or more effective manner. For example, service providers may allow users to search the Web and/or other like networks using various systems, such as on-line content management systems, including search engines, for example. Search engines may, for example, help a user to search the Web from a search query so as to try to locate and/or retrieve on-line content of interest. Also, for example, search engines may help a user obtain answers to questions that maybe posed via a query.

As utilized herein, the terms "search query" and "query" may be used interchangeably and refer to an electronic request, such as may be communicated to a search engine via one or more networks discussed above, for example, for on-line content specified at least in part by one or more query parameters characterizing, at least in part, the requested content. As was indicated, it may be understood that on-line content may be intended to be referenced in a particular discussion, although in the particular context the term "content" may be employed for ease of discussion. In this context, "on-line" refers to a type of access that may be implemented via one or more computing and/or communications networks, such as, for example, the Internet, an intranet, a device network, a network for peripherals, a computer network, or the like. A query may, for example, specify one or more criteria that a search engine may use, at least in part, to identify, retrieve, process, calculate, and/or evaluate, or any combination thereof, a subset of content stored in a database and/or like repository of a metric reporting system, analytics utilities system, and/or other on-line content management system, or any combination thereof. For example, one or more embodiments may comprise one or more query operations, for example, that may be directed to one or more databases and/or like repositories related to one or more on-line content management systems, such as Web-type on-line advertisement systems, although claimed subject matter is not limited in scope in this respect.

Also, in an embodiment, to "perform a query operation," to "answer" a query, or like terms may be used interchangeably and refer to electronically providing results, such as signals and/or states comprising on-line content, for example, at least substantially satisfying the criteria specified by the query. For example, in some instances, performing one or more query operations may include locating and/or retrieving content in connection with a search engine based at least in part on one or more characteristics specified by a query, and/or may include calculating and/or otherwise obtaining an answer to a question that may be specified by a query, to name but a couple of non-limiting examples. As a way of illustration, a user involved in Web-based on-line advertising may, for example, perform a query operation so as to determine an amount of male users between the ages of 19 and 34 residing in New York City that viewed and/or were otherwise exposed to particular on-line content, such as a particular on-line advertisement, over a specified period of time. In an embodiment, for example, to provide a result to such a query, a search engine may "answer" the query via accessing and/or referencing an applicable database and/or like repository that may be related to an on-line advertisement system, for example, at least in part by locating and/or retrieving on-line content from the database and/or like repository. At times, to facilitate and/or support providing a query result, a search engine may, for example, perform one or more calculations based at least in part on one or more characteristics and/or parameters specified by the query, for example, although claimed subject matter is not limited in scope in these respects.

In some instances, one or more query operations, such as implemented in connection with a search engine, for example, may be performed with respect to one or more applicable records, such as stored as signals and/or states in a database. As utilized herein, the term "record" refers to a portion of content, such as on-line content, for example, related to a particular user. At times, a record may comprise, for example, one or more demographics-related aspects, such as age group, sex, etc., on-line history of a user, such as browsing history, digital content (e.g., advertisement, etc.) views, or the like, or any combination thereof. Because, in some instances, content of a larger database may be more computationally expensive to process, random sampling may be utilized, for example, to obtain and/or provide a subset of the larger database (e.g., a smaller database, etc.) on which to perform one or more query operations. Here, a smaller database may, for example, serve as an approximation of a larger database with respect to obtaining query answers. As utilized herein, the terms "sample," "sampling," or like terms refer to a process of determining a substantially representative portion of a larger portion of content, such as on-line content, for example, upon which one or more query operations may be performed to determine one or more characteristics of the larger portion of content. As will be seen, sampling, thus, may at times be capable of generalizing and/or approximating query answers and/or other applicable results determined and/or obtained from a substantially representative portion of a larger portion of content (e.g., a smaller portion of content, etc.) back to a larger portion of content. In some instances, "sample" and/or "sampling" may additionally refer to storing a substantially representative portion of content, such as on-line content, for example, in a database, such as a sampled on-line content database, as explained more fully below.

In some instances, to determine a substantially representative portion of a larger portion of content, such as on-line content, for example, uniform random sampling may be utilized, at least in part. Uniform random sampling may, for example, be utilized to randomly select a subset of records of a larger database, wherein every record has the same sampling probability. At times, uniform random sampling, however, may have issues related to query distribution, in that queries tend to not be uniformly randomly distributed, in at least some instances. For example, a uniformly randomly-sampled database may not yield sufficiently accurate answers to non-uniformly distributed queries, such as queries with smaller number of answers since these or like queries may have a fewer number of samples or, at times, no samples. In some instances, to at least partially address these or like issues, one or more non-uniform sampling techniques may be utilized, in whole or in part. In these techniques, records typically have their own sampling probability, which may account for non-uniformly distributed queries, such as queries with smaller number of answers, for example. One particular non-uniform sampling technique may include, for example, so-called "stratified" sampling, in which records of a database may be partitioned in a manner that attempts to anticipate or predict a distribution of a restricted or finite number of future queries. In some instances, thus, stratified sampling may typically select records with a probability inversely proportional to the size of the partition (e.g., strata) to which they belong, for example. However, in instances in which the distribution of future queries may be unrestricted, for example, such as if future queries are at least largely unknown and/or previously unseen, stratified sampling techniques may not yield sufficiently accurate results (e.g., answers to queries). Accordingly, it may be desirable to develop one or more methods, systems, and/or apparatuses that may facilitate and/or support more effective and/or more efficient content sampling, such as implemented in connection with a search engine, for example, via accounting for sampling probabilities of queries that may be largely unknown and/or previously unseen.

Thus, as will be described in greater detail below, in an implementation, to at least partially address and/or overcome issues of uniform random sampling, stratified sampling, or the like, one or more sampling probabilities for largely unknown and/or previously unseen queries may, for example, be computed by leveraging one or more machine-learning techniques and/or approaches. For example, in an embodiment, one or more machine learning techniques may be utilized, at least in part, to generate and/or select one or more sampling probability parameters for one or more individual records of a database and/or for one or more individual partitions of a database with a goal of improving accuracy and/or efficiency, for example, of one or more query operations to be performed on a sampled subset of the database. Individual records, thus, may be sampled with different sampling probabilities, and relative and/or expected errors of answering largely unknown and/or previously unseen queries may, for example, be eliminated or otherwise reduced, as will also be seen.

FIG. 1 is a schematic diagram illustrating an example embodiment 100 of a search engine environment, in accordance with an embodiment. Example search engine environment 100 may comprise, for example, one or more computing devices, such as on-line content source computing devices 110 that may have content to be stored in a database, such as on-line content storage 130. Further, in an embodiment, a database, such as on-line content storage 130, may comprise on-line content stored as signals and/or states in a memory of one or more computing devices, such as server 120. A database, such as on-line content storage 130, may comprise a version of Apache HBase, currently available or a version available in the future, for example, from for the Apache Software foundation; however, any database is suitable. Hbase is provided merely as an example; claimed subject matter is not limited in scope in this respect.

In an embodiment, a server computing device, such as server 120, may manage access to a database and/or like repository, such as on-line content storage 130, for example. A server, such as server 120, may comprise a search engine, such as search engine 122, that may perform one or more query operations on on-line content, such as may be available, for example, from one or more on-line content sources, such as on-line content sources 110, stored in a database and/or like repository, such as on-line content storage 130. Of course, many servers may be employed in connection with a search engine and this example is simplified for illustrative purposes. Also, in an embodiment, a search engine, such as search engine 122, may sample content, such as on-line content stored in a database, such as on-line content storage 130, to facilitate and/or support one or more query operations. For example, a search engine, such as search engine 122, may sample content, such as on-line content stored in a database, such as on-line content storage 130, and/or may store sampled on-line content in a sampled on-line content database, such as sampled on-line content storage 150, in an embodiment. Also, in an embodiment, a sampled on-line content database, such as sampled on-line content storage 150, may be stored, for example, at the same one or more computing devices, such as server 120, as a larger database, such as on-line content storage 130. However, claimed subject matter is not limited in scope in this respect.

In an embodiment, a search engine, such as search engine 122, may perform one or more query operations on a sampled on-line content database, such as sampled on-line content storage 150, rather than, for example, perform one or more query operations on a relatively larger database, such as on-line content storage 130, to improve search engine efficiency, responsiveness, and/or performance, or any combination thereof. For example, for a relatively larger database, millions and even perhaps billions of individual records may be stored. In an embodiment, one or more databases and/or like repositories that may be utilized, for example, in on-line advertisement systems may, for example, store content associated with millions of users, and/or may, for example, store millions or even billions of parameter values (e.g., user demographic characteristics, user browsing behavior parameters, etc.) associated with the millions of users, for example. In an embodiment, an individual record may comprise content describing, for example, one or more demographic characteristics for a user, and/or may comprise content describing, for example, one or more on-line behavior characteristics for a user, as was indicated. Also, in an embodiment, one or more individual records may comprise content describing, for example, on-line advertisement viewing and/or interaction history for a user, for example. Although example embodiments described herein may refer to on-line advertisement systems and/or databases associated with on-line advertisement systems, claimed subject matter is not limited in scope in these respects. Embodiments in accordance with claimed subject matter may be advantageously employed in a wide range of applications. To perform one or more query operations, for example relatively complex query operations, on such relatively larger databases and/or like repositories may potentially utilize relatively large amounts of computing resources and/or may potentially take relatively large amounts of time to complete. By sampling a relatively larger database, such as on-line content storage 130, to generate a sampled on-line content database, such as sampled on-line content storage 150, one or more query operations may be performed on the sampled on-line content database and/or query results may be generated, for example, in a more efficient and/or more effective manner, in an embodiment.

Figure 2:
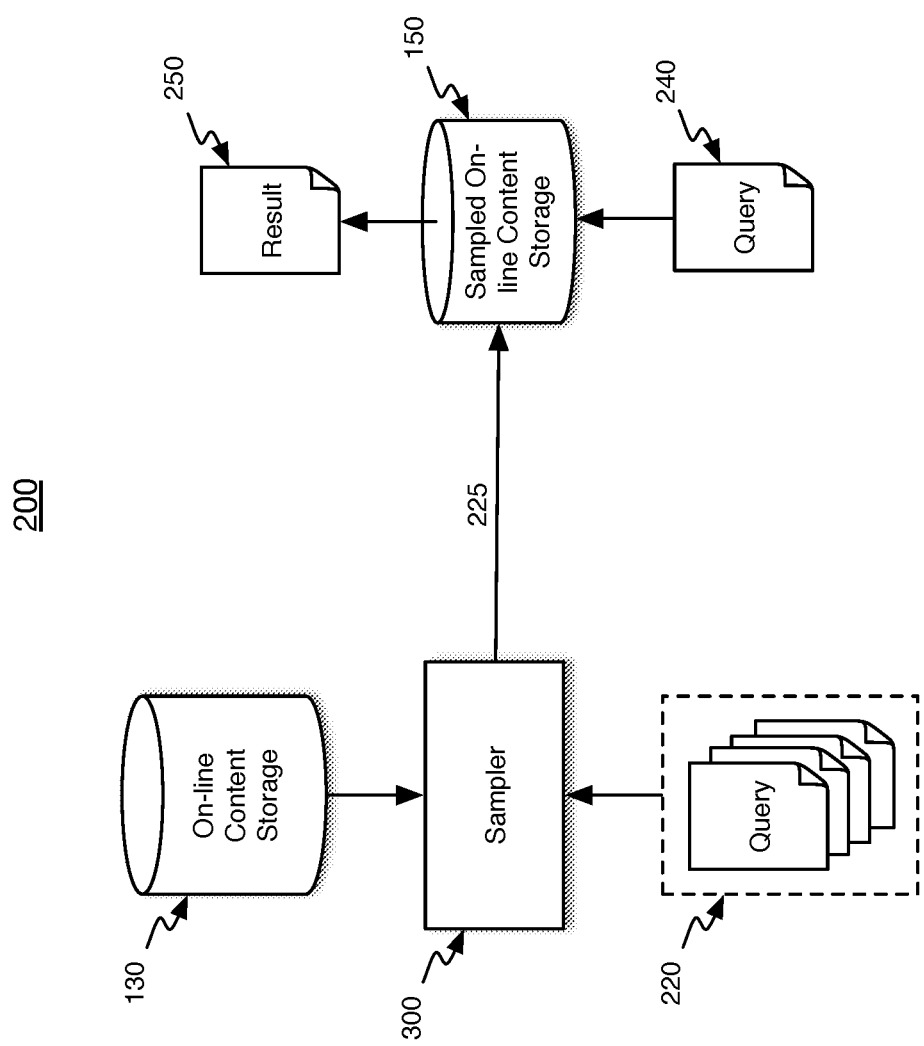
FIG. 2 is a schematic diagram illustrating another example of a search engine environment, in accordance with an embodiment.

FIG. 2 is a schematic diagram illustrating an example embodiment 200 of on-line content sampling, such as implemented in connection with a search engine environment, for example. In an embodiment, example search engine environment 200 may include a sampling device, such as sampler 300, to sample a subset of on-line content from a database, such as on-line content storage 130. In an embodiment, a sampling device, such as sampler 300, may be implemented in hardware, software, or firmware, or any combination thereof, other than software per se. In an embodiment, on-line content, such as sampled on-line content 225, may be stored in a sampled on-line content database, such as sampled on-line content storage 150. A query, such as query 240, may be generated, for example, by a computing device, such as client computing device 140, and a query, such as query 240, may be communicated between a computing device, such as client computing device 140, and a search engine, such as search engine 122 of server 120, for example. In an embodiment, a search engine, such as search engine 122, may perform a query operation, such as specified by query 240, for example, on a sampled on-line content database, such as sampled on-line content storage 150, and/or may provide on-line content, such as result 250, to a computing device, such as client computing device 140, at least in part in response to a query, such as query 240.

In an embodiment, a sampling device, such as sampler 300, may sample on-line content, such as one or more individual records, for example, from a database, such as on-line content storage 130. In an embodiment, determinations with respect to which on-line content to sample may be based, at least in part, on one or more sampling probability parameters that may be stored, for example, in a database, such as on-line content storage 130, and/or in a sampled on-line content database, such as sampled on-line content database 150, for example. In an embodiment, one or more individual records in a database, such as on-line content storage 130, may be associated with and/or may comprise one or more respective sampling probability parameters. A sampling device, such as sampler 300, may determine which on-line content, such as which records, to sample and/or to be provided to a sampled on-line content database, such as sampled on-line content storage 150, based at least in part on one or more individual sampling probability parameters associated with one or more individual records. As used herein, the term "sampling probability parameter" refers to a probability, such as represented via an appropriate value, that an individual record, such as an individual record of a database and/or like repository, such as on-line content storage 130, will be sampled via a sampling operation. In an embodiment, sampling probability parameters may be determined, for example, via a single pass over a database, such as on-line content storage 130, by a sampler device, such as sampler 300. Also, in an embodiment, sampling probability parameters may be stored, for example, in a sampled content database, such as sampled on-line content storage 150. Further, in an embodiment, sampling probability parameters may be utilized when evaluating queries, for example, to upscale individual sampled records by an inverse of the individual record's sampling probability parameter value, for example, as explained more fully below.

In another embodiment, one or more individual records of a database, such as on-line content storage 130, may be assigned one or more individual sampling probability parameters. That is, in an embodiment, one or more individual records may be assigned their own at least one sampling probability parameter, which may be the same as one or more other records or which may differ from one or more other records. In an embodiment, one or more sampling probability parameters may be adjusted for one or more individual records in order to provide more adequate sample coverage for more difficult and/or relatively more complex and/or previously unseen and/or unknown queries that may be presented for evaluation in the future, for example. For example, a query may be considered to be a more difficult and/or complex query if it matches relatively very few records in a full database, such as online-content storage 130. For example, a query designed to count an amount of people from a small country that visited a particular Web page devoted to an unpopular hobby during a relatively narrow time frame may be considered to be difficult and/or complex, although, of course, claimed subject matter is not limited in scope in these respects. In an embodiment, one or more sampling probability parameters may be adjusted for one or more individual records in order to provide more adequate sample coverage for such difficult and/or complex queries, for example.

Also, in an embodiment, records of a database, such as on-line content storage 130, may be partitioned into one or more strata in a process that may be referred to as stratification, as mentioned previously. However, claimed subject matter is not limited in scope in this respect. In an embodiment, one or more records of a database may be partitioned into one or more strata, and/or one or more sampling probability parameters may be assigned to one or more records on a per-strata basis. That is, for a stratified database, records belonging to a particular strata may be assigned the same sampling probability parameter, in an embodiment. In another embodiment, records of a database, such as on-line content storage 130, may not be stratified, in that one or more sampling probability parameters may be assigned on a per-record basis.

Figure 3:
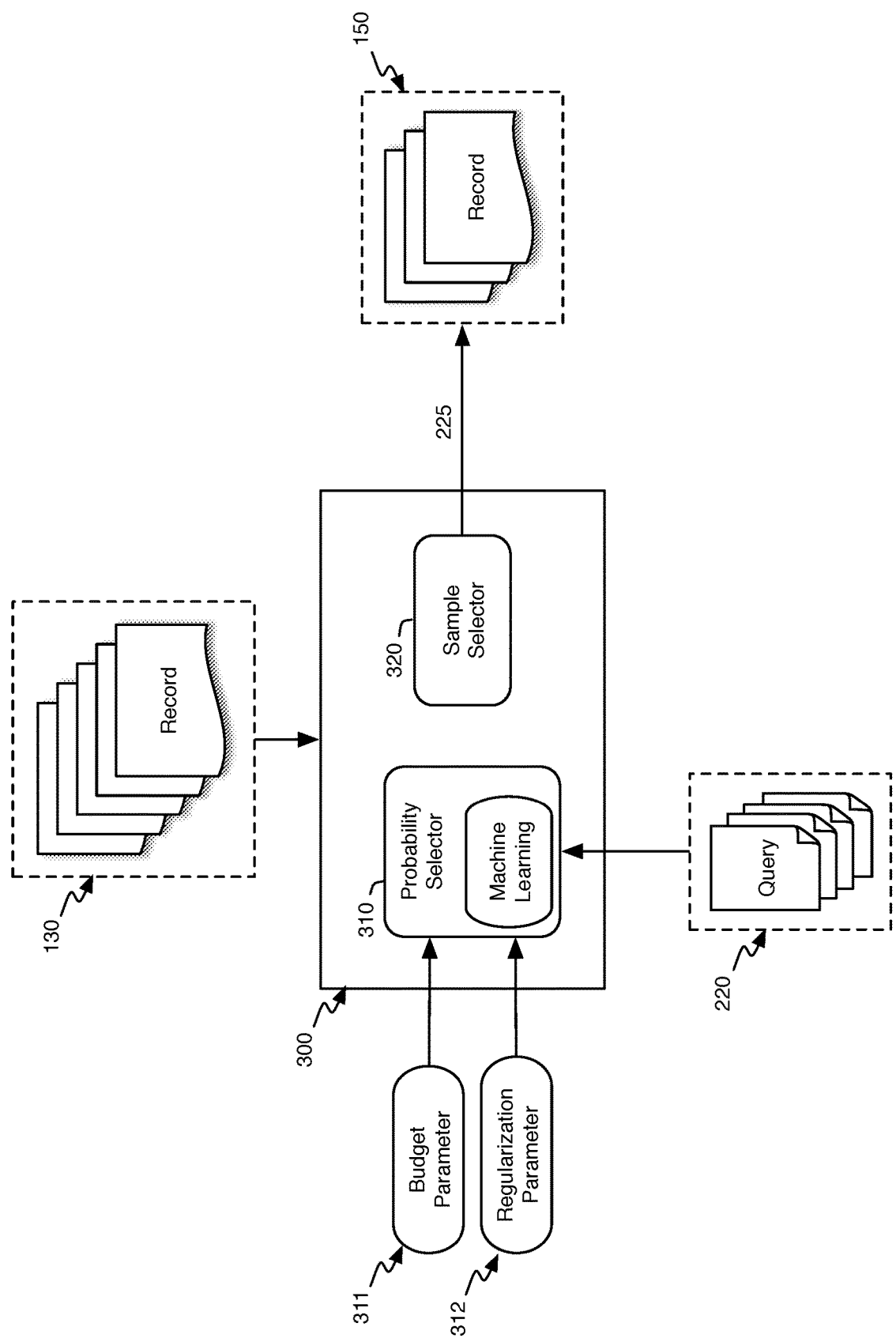
FIG. 3. is a schematic diagram illustrating an example system for sampling on-line content, in accordance with an embodiment.

FIG. 3. is a schematic diagram illustrating an example embodiment 300 of a sampling device, such as sampler 300. In an embodiment, a probability selector, such as 310, may employ one or more machine learning operations based, at least in part, on a training set of queries, such as 220, to determine one or more individual sampling probability parameters for one or more individual records of a database, such as on-line content storage 130, over their distribution, unknown or otherwise. As used herein, the term "machine learning" as it relates to determination of one or more sampling probability parameters, for example, refers to a process implemented via an electronic device, such as a computing device programmed accordingly, for example, utilizing results of an operation, such as a query operation, to adjust operation of the electronic device without further human intervention based at least in part on the results. Additionally, in an embodiment, a probability selector, such as 310, may determine one or more individual sampling probability parameters for one or more individual records of a database, such as on-line content storage 130, based at least in part on a budget parameter, such as 311, and/or based at least in part on a regularization parameter, such as 312, for example. In some instances, such as when a training set may be an imperfect approximation of a full distribution of queries, there may exist a tension between fitting the training set well and providing accurate answers to future queries that may not resemble the training set. In such circumstances, for example, a regularization mechanism, such as regularization parameter 312, may be employed in determining sampling probability parameters to provide a solution that may be a worse fit to a training set but that may work better on novel queries. In an embodiment, a regularization parameter, such as 312, for example, may determine how much a solution should deviate from a perfect fit, for example. In an embodiment, a value for a regularization parameter, such as 312, may be determined, at least in part, by a sampling device, such as sampler 300, and/or may be determined, at least in part, in accordance with an amount of queries and/or in accordance with how well the queries represent future and/or unknown queries, for example. Also, in an embodiment, a value for a regularization parameter, such as 312, may be determined, at least in part, via a cross-validation approach, although claimed subject matter is not limited in scope in this respect.

Further, in an embodiment, one or more individual records of a database, such as on-line content storage 130, may be assigned one or more individual cost parameters. In an embodiment, a cost parameter for a particular record may represent a cost (e.g., computing resources) to be incurred in storing and/or processing, for example, the particular individual record. For example, in an embodiment, a cost parameter may represent an amount of storage, such as in a memory, that may be used to store content associated with an individual record. Also, in an embodiment, a budget parameter, such as 311, may represent an amount of storage that may be utilized to store all records in a sampled on-line content database, such as sampled on-line content storage 150, and/or may represent a total of all cost parameter values for a sampled on-line content database, such as sampled on-line content storage 150, for example.

In an embodiment, one or more example machine learning operations, such as may be utilized in sampling operations, for example, may adhere to and/or may be consistent with a "probably approximately correct" (PAC) learning approach, such as proposed by L. Valiant in "*A Theory of the Learnable*," Communications of the ACM, 27, 1984, although claimed subject matter is not limited in scope in this respect. In an embodiment, given substantially randomly selected samples of previously evaluated queries, for example, such as training set of queries 220, one or more machine learning operations may be utilized, for example, to reduce an expected error for queries, including previously unseen and/or unknown queries that may be submitted to a search engine, such as search engine 122, as was indicated.

In one or more example relations provided below, and/or for one or more embodiments, a sampling probability, represented by a value $p_i$, denotes a probability that a particular $i^{th}$ record of a plurality of records of a database and/or like repository, such as on-line content storage 130, may be sampled via a sampling operation. Also, in an embodiment, $q_i$ denotes a result of evaluating a query q on a particular $i^{th}$ record. Also, for example, y denotes a result of query q evaluated over the various records of a database, such as on-line content storage 130, in an embodiment. For example, a result y may be provided according to an example relation:

$$y = \Sigma_i q_i \qquad (1)$$

In some instances, result y provided above, for example, may represent a result to be provided, for example, by processing a query with respect to a database, such as on-line content storage 130. Also, in an embodiment, result y provided above, for example, is not meant to represent an approximate result as may be provided by processing a query with respect to a sampled on-line content database, such as sampled on-line content storage 150. In an embodiment, an approximation "$y_{approx}$" of a result "y" may be provided according to an example relation provided below:

$$y_{approx} = \Sigma_{i \in S} q_i / p_i \qquad (2)$$

wherein S denotes a set of sampled records, such as may be obtained by sampling a database, such as on-line content storage 130. As mentioned above, results for a query for a particular record, such as query $q_i$ in example relation (2) above, may be upscaled by a factor comprising an inverse of a probability parameter value, such as $p_i$, for the particular record. As can be seen in example relation (2) above, in an embodiment, an approximation $y_{approx}$ of a result y may be generated at least in part by summing, for one or more individual records of a sampled on-line content database, such as sampled on-line content storage 150, upscaled results for the one or more individual records of the sampled on-line content database, according to a relation $q_i/p_i$, whereby $q_i$ denotes an evaluated query with respect to a particular record and wherein $p_i$ denotes a sampling probability parameter value for the particular record, for example. In an embodiment, an example upscaling approach may comprise a Horvitz-Thompson estimation approach, although claimed subject matter is not limited in scope in this respect.

In an embodiment, one or more machine learning operations may include applying a "loss" function to a predicted result (e.g., a result obtained by evaluating a query over a sampled on-line content database). In an embodiment, a loss function may determine, for example, how much a result obtained by evaluating a query over a sampled on-line content database, such as sampled on-line content storage 150, may differ from a result obtained over a full database, such as on-line content storage 130. For example, in an embodiment, an example "squared loss" function may be evaluated with respect to probability vector p and query q, as depicted in the example relation below:

$$\text{Loss}(p,q) = \Sigma q_i^2 (1/p_i - 1) \qquad (3)$$

Although example embodiments herein refer to a squared loss function, claimed subject matter is not limited in scope to that particular loss function, and/or to any particular loss function. For example, in other embodiments, other loss functions may be utilized, such as, for example, and not by way of limitation, absolute loss functions and/or deviation loss functions. Also, as explained more fully below, determination of one or more sampling probability parameters for one or more individual records of a database, such as on-line content storage 130, may be based, at least in part, on a loss function, in an embodiment.

In an embodiment, a budget parameter, such as 311, may represent an amount of memory and/or storage space needed to store a sampled database, such as sampled on-line content storage 150, and/or may represent a total of all cost parameter values for a sampled on-line content database, such as sampled on-line content storage 150, for example. In an embodiment, a budget parameter, such as 311, may constrain, at least in part, sampling probability values to be assigned to records of a database, such as on-line content storage 130. For example, a budget parameter may constrain sampling probability value selection according to the following example relation:

$$\Sigma p_i c_i \leq B \qquad (4)$$

wherein $p_i$ denotes a sampling probability parameter, and $c_i$ denotes a cost parameter, for an $i^{th}$ record of a plurality of records of a database, such as on-line content storage 130, and wherein B denotes a budget parameter, such as 311. As provided in example relation (4) above, in an embodiment, a sum of a product of sampling probability parameter values and cost parameter values for a plurality of records of a database, such as on-line content storage 130, may be constrained to a value of no larger than a budget parameter value, such as 311. As explained more fully below, determination of one or more sampling probability parameters for one or more individual records of a database, such as on-line content storage 130, may be based, at least in part, on a budget parameter, such as 311, in an embodiment.

In an embodiment, empirical risk minimization (ERM) machine learning techniques may be utilized, at least in part, in determining one or more sampling probability parameters to assign to one or more individual records of a database, such as on-line content storage 130. Although the phrase "empirical risk minimization" incorporates the term "minimization", embodiments in accordance with claimed subject matter may reduce error for expected results with respect to one or more query operations, and claimed subject matter is not limited in scope to minimizing error and/or risk, although error and/or risk minimization is not excluded from claim scope. Also, embodiments in accordance with claimed subject matter are not limited in scope to use of ERM machine learning techniques. In an embodiment, $R_{emp}(p)$ may represent an average loss of a function and/or approach, such as parameter vector p wherein one or more individual elements of vector p comprise one or more individual probability parameters for one or more individual records, over a set of queries, such as training set of queries 220. In example relations described herein, and/or for one or more embodiments, a set of queries, such as training set of queries 220, may be denoted as Q. In an embodiment, a training set of queries, such as 220, may comprise a substantially randomly selected collection of queries drawn from a larger set of queries. In an embodiment, a training set of queries, such as 220, may comprise previously obtained and/or evaluated queries. Also, in an embodiment, probability vector p, wherein one or more individual elements of vector p comprise one or more individual probability parameters for one or more individual records, may be provided according to an example relation:

$$p = \operatorname{argmin} R_{emp}(p) = \operatorname{argmin} \frac{1}{|Q|} \sum \text{Loss}(p, q) \qquad (5)$$

As may be seen in example relation (5) above, parameter vector p may be determined in a manner to comprise, at least approximately, a smaller value (e.g., arg min) of $R_{emp}(p)$, which may, as mentioned above, represent an average loss over a set of queries Q, such as training set of queries 220, for example.

Further, in an embodiment, a regularization parameter may be applied to one or more machine learning operations to determine one or more individual sampling probability parameters for records of a database, such as on-line content storage 130. In an embodiment, a regularization parameter "$\zeta$" may comprise, for example, a threshold against which one or more individual sampling probability parameters may be constrained. For example, in an embodiment, an example relation $p_i \geq \zeta$ may be implemented, whereby sampling probability parameters may not be smaller in value than regularization parameter $\zeta$. Also, in an embodiment, a regularization parameter $\zeta$ may be selected, at least in part, according to an example relation:

$$0 \leq \zeta \leq B/\Sigma_i c_i \qquad (6)$$

wherein B denotes a budget parameter, such as 311, and wherein $c_i$ denotes a cost parameter for one or more individual records, for example, as described above. Example regularization parameter values and their relationships to example expected error values are depicted, for example, in FIG. 5, discussed below.

In an embodiment, an example process for determining one or more sampling probability parameters for one or more individual records of a database, such as on-line content storage 130, may be presented in terms of an example relation, provided below:

$$p = \arg\min_p \Sigma_{q \in Q} \Sigma_i q_i^2 (1/p_i - 1) \qquad (7)$$

As may be seen in example relation (7) above, parameter vector p may be determined in a manner to comprise, at least approximately, a smaller value (e.g., arg min) of a summation over a training set of queries Q of a loss function, such as an example loss function provided above in example relation (3), in an embodiment. Also, example relation (7) may be evaluated, for example, under constraints provided via example relation (4) provided above, in an embodiment. Further, in an embodiment, one or more sampling probability parameters $p_i$, for one or more individual records of a database, such as on-line content storage 130, may be constrained at least in part according to a regularization parameter $\zeta$ and/or at least in part in accordance with an example relation:

$$\forall i p_i \in [\zeta, 1] \qquad (8)$$

As can be seen from example relation (8), one or more sampling probability parameters $p_i$ for one or more individual records may be bounded by a regularization parameter $\zeta$ and/or by a specified constant value, which, in an embodiment, may comprise the value "1". However, claimed subject matter is not limited in scope in this respect.

For an embodiment, an example approach for determining a vector p of sampling probability parameters for one or more individual records of a database, such as on-line content storage 130, for example, may include an approach provided below:

Example Approach (1)

1. input: training queries Q (e.g., training set of queries 220), budget parameter B (e.g., budget parameter 311), one or more individual cost parameters $c_i$ for one or more individual records of a database and/or like repository (e.g., on-line content database 130), and a regularization factor η related to regularization parameter $\zeta$ (e.g., regularization parameter 312), wherein η∈[0,1]
2. $\zeta = \eta * (B / \Sigma_i c_i)$
3.

$$\forall\, ip_i' \leftarrow \sqrt{\sum_{q \in Q} q_i^2 / c_i}$$

wherein $q_i$ denotes an evaluated query with respect to a particular $i^{th}$ record 4. Perform binary search for λ such that:

$$\Sigma_i c_i * \max(\zeta, \min(1, \lambda p_i')) = B$$

5. output: p=max($\zeta$, min(1, λp'))
   wherein p' denotes a vector (e.g., list) of intermediate sampling probability values.

In an embodiment, example operations 3 and 4 of example approach (1) may calculate solutions to example relations (4), (7), and (8), provided above. For example, operation 3 of example approach (1) may determine which sampling probabilities ought to be bigger and by how much, and in operation 4 of example approach (1) the sampling probabilities may be rescaled and clipped to satisfy specified constraints, in an embodiment. Also, in an embodiment, a cost of executing operation 3 of example approach (1) may be substantially linear with respect to an amount of non-zero values for $q_i$, wherein $q_i$ denotes an evaluated query with respect to a particular record, for example. Further, in an embodiment, a cost of executing operation 4 of example approach (1) may be substantially logarithmic with respect to an amount of records in a full on-line content database, such as on-line content storage 130, for example.

In an embodiment, example approach (1), provided above, may be implemented in hardware, software, or firmware, or any combination thereof except for software per se, for example. In an embodiment, example approach (1) may be implemented in software, and/or may be executed on a server computing device, such as server 120, for example. Also, in an embodiment, example processes for determining one or more individual sampling probability parameters, such as example approach (1) provided above, may at least approximately implement operations such as those described above with respect to example relations 4-8. However, although a particular example algorithm is provided above, and although particular example relations are also provided above, claimed subject matter is not limited in scope to the specific examples provided herein. Other embodiments may incorporate one or more machine learning operations and/or techniques and/or other processes for determining one or more individual sampling probability parameters for one or more individual records, for example, other than the examples described herein.

Figure 4:
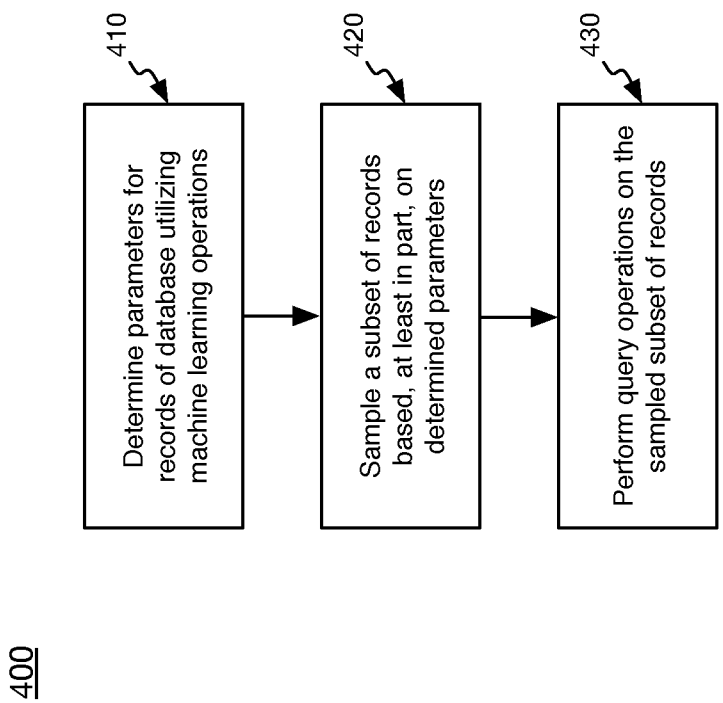
FIG. 4 is a flow diagram illustrating an example process for sampling on-line content in a search engine environment, in accordance with an embodiment.

FIG. 4 is a flow diagram illustrating an example process for sampling on-line content in a search engine environment, in accordance with an embodiment. Embodiments in accordance with claimed subject matter may include all of blocks 410-430, fewer than blocks 410-430, or more than blocks 410-430. Also, the order of blocks 410-430 is merely an example order, and claimed subject matter is not limited in scope in this respect.

As depicted at block 410, one or more parameters may be determined for one or more individual records of a database, such as on-line content storage 130. In an embodiment, one or more sampling probability parameters may be determined for one or more individual records of a database, such as on-line content storage 130. In an embodiment, one or more machine learning operations may be utilized to select one or more sampling probability parameters for one or more individual records, for example, as discussed above. Further, as depicted at block 420, a subset of records may be sampled from a database, such as on-line content storage 130, based, at least in part, on one or more determined parameters, in an embodiment. For example, a subset of records may be sampled based, at least in part, on one or more sampling probability parameters determined for one or more individual records of a database, such as on-line content storage 130, as also described above.

Additionally, in an embodiment, one or more query operations may be performed on a sampled subset of records, as depicted at block 430, in an embodiment. As described above, one or more query operations performed on a sampled subset of records, such as sampled on-line content database 150, may provide approximate results as compared to what may otherwise be provided for one or more query operations performed on a relatively larger database, such as on-line content storage 130. However, one or more query operations for a sampled subset of records, such as sampled on-line content storage 150, may be performed in a more efficient matter, for example. As further explained above, one or more machine learning operations may be utilized to select one or more sampling probability parameters for one or more individual records of a database, such as on-line content storage 130, to reduce an expected error between approximate results yielded through one or more query operations over a sampled subset of on-line content and results that may otherwise be provided through one or more query operations performed over a relatively larger database, such as on-line content storage 130, in an embodiment.

Figure 5:
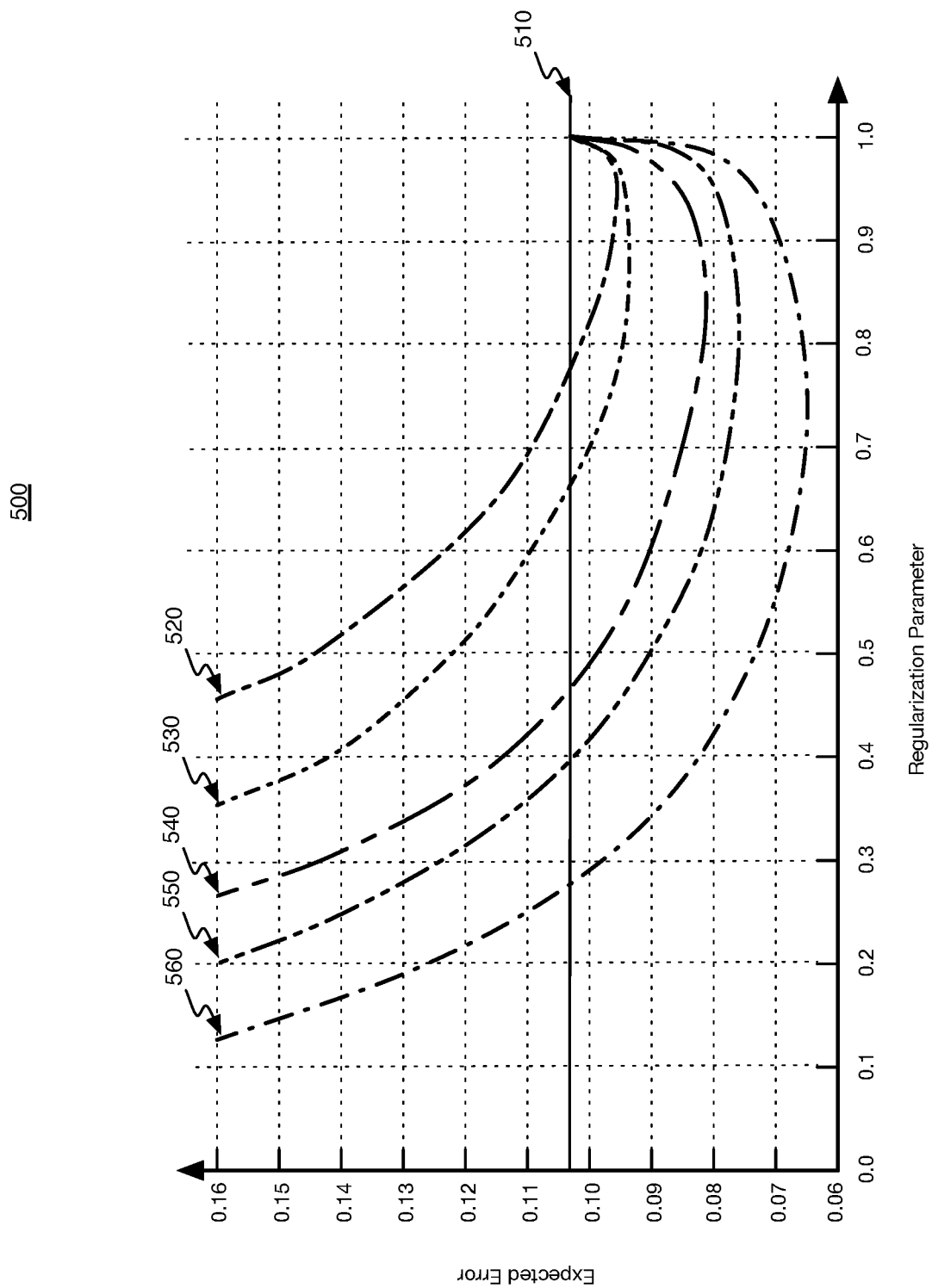
FIG. 5 shows an example plot depicting example expected error vs. regularization parameter curves representative of on-line content collected for an example on-line content sampling process, in accordance with an embodiment.

FIG. 5 shows an example plot 500 depicting example expected error vs. regularization parameter curves 520-560 representative of on-line content obtained in connection with an example on-line content sampling process, in accordance with an embodiment. For the example curves 520-560 depicted example plot 500, sampling probability parameters for one or more individual records of a database for an on-line advertisement system comprising records for a relatively larger number of users were determined utilizing example embodiments including machine learning techniques described above. The various example curves of example plot 500 correspond to different amounts of training queries utilized to train machine learning aspects of a sampling system utilized to sample a user database. The various example curves 520-560 demonstrate relationships between various values of regularization parameters and expected error amounts. For example plot 500, curve 520 represents test on-line content collected after machine learning training with 50 training queries. Example curve 530 represents test on-line content collected after machine learning training with 100 training queries, and example curve 540 represents test on-line content collected after machine learning training with 200 training queries. Further, example curve 550 represents test on-line content collected after machine learning training with 400 training queries, and example curve 560 represents test on-line content collected after machine learning training with 800 training queries. A solid line 510 is provided to show example results based on uniform sampling techniques. Thus, as can be seen in example plot 500, embodiments in accordance with claimed subject matter may reduce expected error for one or more query operations over a sampled on-line content database, such as sampled on-line content storage 150, over uniform sampling techniques, depending, at least in part, on appropriate selection of a regularization parameter. Generally, larger training sets can be observed in example plot 500 to yield improved results over smaller training sets. Also, for example plot 500, a regularization parameter of about 0.6-0.9 may provide improved results (e.g., lower expected error values), for the examples depicted in example plot 500. Of course, the specific curves of example plot 500, and/or observations that may be made therefrom, are specific to a particular set of circumstances, and other circumstances may yield different curves. As may be seen from the example plots depicted in FIG. 5, experiments show that statistically significant improvements may be realized over uniform sampling and/or standard stratified sampling techniques via implementation of machine learning techniques to determine one or more sampling probability parameters for one or more records of a database. Also, experiments show successful implementation of embodiments described herein with large databases, such as databases including a large number of records associated with a large number of users.

Figure 6:
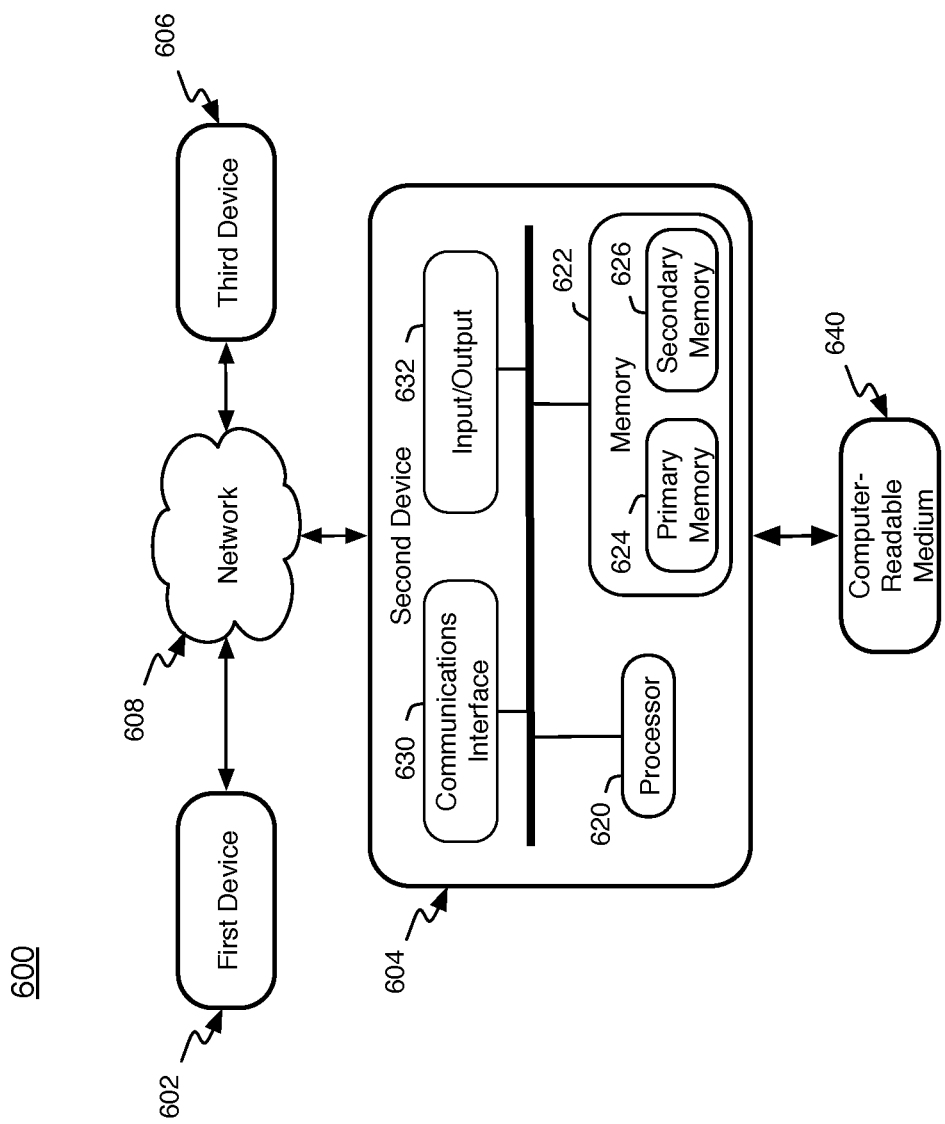
FIG. 6 is a schematic diagram illustrating an example computing device, in accordance with an embodiment.

For purposes of illustration, FIG. 6 is an illustration of an embodiment of a system 600 that may be employed in a client-server type interaction and/or other computing device-to-computing device type interaction, such as described infra in connection with search engines, on-line content sampling, and/or query operations, for example. In FIG. 6, computing device 602 ('first device' in FIG. 6), which may comprise features of a client computing device, on-line content source computing device, and/or server computing device, may interface with computing device 604 ('second device' in FIG. 6), which may comprise features of a client computing device, on-line content source computing device, and/or server computing device, for example. Communications interface 630, processor (e.g., processing unit) 620, and memory 622, which may comprise primary memory 624 and secondary memory 626, may communicate by way of a communication bus, for example. In FIG. 6, computing device 602 may represent one or more sources of analog, uncompressed digital, lossless compressed digital, and/or lossy compressed digital formats for content of various types, such as electronic documents, video, imaging, text, audio, etc. in the form physical states and/or signals, for example. Computing device 602 may communicate with computing device 604 by way of a connection, such as an internet connection, via network 608, for example. Although computing device 604 of FIG. 6 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter be limited in scope to illustrative examples.

Processor 620 may be representative of one or more circuits, such as digital circuits, to perform at least a portion of a computing procedure and/or process. By way of example, but not limitation, processor 620 may comprise one or more processors, such as controllers, microprocessors, microcontrollers, application specific integrated circuits, digital signal processors, programmable logic devices, field programmable gate arrays, and/or the like, and/or any combination thereof. In implementations, processor 620 may perform signal processing to manipulate signals and/or states, to construct signals and/or states, etc., for example.

Memory 622 may be representative of any storage mechanism. Memory 620 may comprise, for example, primary memory 622 and secondary memory 626, additional memory circuits, mechanisms, or combinations thereof may be used. Memory 620 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 620 may be utilized to store a program. Memory 620 may also comprise a memory controller for accessing computer readable-medium 640 that may carry and/or make accessible content, which may include code, and/or instructions, for example, executable by processor 620 and/or some other unit, such as a controller and/or processor, capable of executing instructions, for example.

Under direction of processor 620, memory, such as memory cells storing physical states, representing, for example, a program, may be executed by processor 620 and generated signals may be communicated via the Internet, for example. Processor 620 may also communicate digitally-encoded signals with respect to client computing device 602.

Network 608 may comprise one or more network communication links, processes, services, applications and/or resources to support exchanging communication signals between a computing device, such as 602, and computing device 806 ('third device' in FIG. 6), which may, for example, comprise one or more client computing devices, on-line content source computing devices, and/or server computing devices. By way of example, but not limitation, network 608 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store digital content, such as electronic documents, measurements, text, images, video, audio, etc. in the form of signals and/or states. Thus, a computing device, in this context, may comprise hardware, software, firmware, or any combination thereof (other than software per se). Computing device 604, as depicted in FIG. 6, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 622 may store cookies relating to one or more users and may also comprise a computer-readable medium that may carry and/or make accessible digital content, including code and/or instructions, for example, executable by processor 620 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable or embedded smart card that is able to store subscription digital content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate digital content, such as, for example, textual content, multimedia content, and/or the like. A computing and/or network device may also include and/or execute a software application to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be substantially compliant and/or substantially compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of digital content, such as signal measurements, text, images, video, audio, etc. It has proven convenient at times, principally for reasons of common usage, to refer to such physical signals and/or physical states as bits, values, elements, symbols, characters, terms, numbers, numerals, measurements, digital content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method, comprising:
  determining, by at least one server computing device, for each one of a plurality of sets of records, one or more parameters utilizing, at least in part, one or more machine learning operations, each set of records of the plurality of sets of records including one or more of a plurality of records of at least one database, wherein the determining comprises determining one or more first parameters for a first set of records and determining one or more second parameters for a second set of records;
  sampling, by the at least one server computing device, a subset of records of the plurality of records based, at least in part, on the one or more parameters for at least a portion of the plurality of sets of records, wherein the sampling comprises sampling a first portion of the plurality of sets of records with a first sampling probability associated with the one or more first parameters and sampling a second portion of the plurality of sets of records with a second sampling probability associated with the one or more second parameters;

performing, by the at least one server computing device, one or more query operations on the sampled subset of records; and providing, by the at least one server computing device, query results according to a result of performing the one or more query operations on the sampled subset of records.

2. The method of claim 1, wherein the determining, for each set of records of the plurality of sets of records, the one or more parameters comprises determining one or more sampling probability parameters for the set of records utilizing, at least in part, the one or more machine learning operations.

3. The method of claim 1, wherein the one or more first parameters and the one or more second parameters are determined via a single pass over the at least one database by a sampler device.

4. The method of claim 2, comprising:
partitioning the plurality of records of the at least one database into two or more strata, each set of records of the plurality of sets of records corresponding to a different one of the two or more strata; and
for each set of records of the plurality of sets of records, assigning corresponding sampling probability parameters to the set of records such that the corresponding sampling probability parameters are associated with records within the set of records.

5. The method of claim 1, wherein the performing the one or more machine learning operations comprises performing the one or more machine learning operations over a training set of queries.

6. The method of claim 1, wherein the first sampling probability used to sample the first portion of the plurality of sets of records is different than the second sampling probability used to sample the second portion of the plurality of sets of records.

7. The method of claim 1, wherein the one or more first parameters comprise a first budget parameter representing a first amount of memory needed to store at least some of the first set of records, and the one or more second parameters comprise a second budget parameter representing a second amount of memory needed to store at least some of the second set of records.

8. The method of claim 1, comprising:
storing the sampled subset of records in a content database;
wherein the one or more query operations are performed on the content database.

9. The method of claim 1, the one or more query operations being performed responsive to receiving a query, via a network, from a client device.

10. The method of claim 1, content of the sampled subset of records being representative of content of the plurality of records.

11. The method of claim 5, wherein the performing the one or more machine learning operations comprises applying a loss function to determine, for each query in the training set, how much a result obtained over a sampled on-line content database differs from a result obtained for the at least one database including the plurality of records.

12. The method of claim 1, comprising:
for each set of records of the plurality of sets of records, assigning corresponding parameters to the set of records such that the corresponding parameters are associated with each record within the set of records.

13. The method of claim 1, wherein the determining the parameters for one set of records of the plurality of sets of records comprises selecting, via the one or more machine learning operations, the one or more parameters for the one set of records based, at least in part, on one or more cost parameters for the set of records, the one or more cost parameters representing an amount of computing resources to be incurred in at least one of processing or storing the set of records.

14. An apparatus comprising:
at least one computing device; and
the at least one computing device including at least one processor and at least one memory, at least one of the at least one processor or the at least one memory being configured to:
perform one or more machine learning operations to determine, for each one of a plurality of sets of records, one or more parameters, each set of records of the plurality of sets of records including one or more of a plurality of records of at least one database, wherein the determining comprising determining one or more first parameters for a first set of records and determining one or more second parameters for a second set of records;
sample a subset of records of the plurality of records based, at least in part, on the one or more parameters for at least a portion of the plurality of sets of records, wherein the sampling comprises sampling a first portion of the plurality of sets of records with a first sampling probability associated with the one or more first parameters and sampling a second portion of the plurality of sets of records with a second sampling probability associated with the one or more second parameters;
perform one or more query operations on the sampled subset of records;
and
provide query results according to a result of performing the one or more query operations on the sampled subset of records.

15. The apparatus of claim 14, wherein the one or more parameters comprises one or more sampling probability parameters.

16. The apparatus of claim 15, at least one of the processor or the memory being configured to:
partition the plurality of records of the at least one database into two or more strata, each set of records of the plurality of sets of records corresponding to a different one of the two or more strata.

17. The apparatus of claim 14, at least one of the processor or the memory being configured to perform the one or more machine learning operations over a training set of queries.

18. The apparatus of claim 14, at least one of the processor or the memory being configured to perform the one or more machine learning operations based, at least in part, on one or more cost parameters for each set of records of the plurality of sets of records, the one or more cost parameters representing an amount of computing resources to be incurred in at least one of processing or storing the set of records.

19. The apparatus of claim 15, at least one of the processor or the memory being configured to select, via the one or more machine learning operations, the one or more sampling probability parameters for each set of records of the plurality of sets of records based, at least in part, on one or more cost parameters for the set of records, the one or more cost parameters representing an amount of computing resources to be incurred in at least one of processing or storing the set of records.

20. The apparatus of claim 15, at least one of the processor or the memory being configured to determine the one or more sampling probability parameters without stratification of the at least one database.

21. A non-transitory computer-readable medium comprising instructions that when executed perform operations, comprising:
- determining, for each one of a plurality of sets of records, one or more parameters utilizing, at least in part, one or more machine learning operations, each set of records of the plurality of sets of records including one or more of a plurality of records of at least one database, wherein the determining comprises determining one or more first parameters for a first set of records and determining one or more second parameters for a second set of records;
- sampling a subset of records of the plurality of records based, at least in part, on the one or more parameters for at least a portion of the plurality of sets of records, wherein the sampling comprises sampling a first portion of the plurality of sets of records with a first sampling probability associated with the one or more first parameters and sampling a second portion of the plurality of sets of records with a second sampling probability associated with the one or more second parameters;
- performing one or more query operations on the sampled subset of records; and
- providing query results according to a result of performing the one or more query operations on the sampled subset of records.

22. The non-transitory computer-readable medium of claim 21, wherein the one or more parameters comprises one or more sampling probability parameters.

23. The non-transitory computer-readable medium of claim 21, wherein the determining the one or more parameters comprises determining one or more sampling probability parameters for each set of records of the plurality of sets of records without stratification of the at least one database.

24. The non-transitory computer-readable medium of claim 22, the operations further comprising:
- partitioning the plurality of records of the at least one database into two or more strata, each set of records of the plurality of sets of records corresponding to a different one of the two or more strata.

25. The non-transitory computer-readable medium of claim 22, wherein the performing the one or more machine learning operations comprises performing the one or more machine learning operations over a training set of queries.

26. The non-transitory computer-readable medium of claim 22, wherein the performing the one or more machine learning operations comprises performing the one or more machine learning operations based, at least in part, on one or more cost parameters for each set of records of the plurality of sets of records, the one or more cost parameters representing an amount of computing resources to be incurred in at least one of processing or storing the set of records.

* * * * *